United States Patent [19]

Sakoh et al.

[11] Patent Number: 5,686,817
[45] Date of Patent: *Nov. 11, 1997

[54] BATTERY CHARGER HAVING MICROCOMPUTER FOR ADJUSTING CHARGING CURRENT

[75] Inventors: Masahiko Sakoh; Tatsuki Mori, both of Anjo, Japan

[73] Assignee: Makita Corporation, Anjo, Japan

[*] Notice: The term of this patent shall not extend beyond the expiration date of Pat. No. 5,453,677.

[21] Appl. No.: 421,443

[22] Filed: Apr. 13, 1995

[30] Foreign Application Priority Data

Apr. 13, 1994 [JP] Japan .................................. 6-074726

[51] Int. Cl.⁶ .................................................. H01M 10/46
[52] U.S. Cl. .................................................. 320/39; 320/49
[58] Field of Search ........................ 320/1, 5, 9, 12, 320/13, 29, 39, 48, 49, 54; 323/241, 283; 363/135, 160

[56] References Cited

U.S. PATENT DOCUMENTS

| | | | |
|---|---|---|---|
| 4,593,348 | 6/1986 | Tawesmeier | 320/9 |
| 4,779,050 | 10/1988 | Ohnari | 320/48 |
| 5,453,677 | 9/1995 | Sakoh et al. | 320/39 |
| 5,483,142 | 1/1996 | Skibinski et al. | 320/1 |

*Primary Examiner*—Edward Tso
*Attorney, Agent, or Firm*—Dennison, Meserole, Pollack & Scheiner

[57] ABSTRACT

A battery charger includes a microcomputer operable to receive an input value corresponding to a value of charging current. A thyristor has the gate connected to an output port of the microcomputer. The microcomputer operable to adjust the firing angle of the thyristor for controlling the value of the charging current through a phase control of the charging current in response to the input value. A capacitor has a first electrode connected to the gate of the thyristor. A transistor has the collector connected to a second electrode of the capacitor, the base connected to the output port of the microcomputer, and the emitter connected to a power source voltage for the microcomputer.

4 Claims, 10 Drawing Sheets

BATTERY CHARGER HAVING MICROCOMPUTER FOR ADJUSTING CHARGING CURRENT

BACKGROUND OF THE INVENTION

1. Field of the Invention

The present invention relates to a battery charger operable to charge a battery by a commercial AC power source, and particularly to a battery charger including a microcomputer which is operable to receive an input value corresponding to a value of a charging current and which is operable, in response to the input value, to adjust the firing angle of a thyristor which has the gate connected to an output port of the microcomputer for controlling the value of the charging current through a phase control of the charging current. Here, the microcomputer is a computer having a CPU, a ROM, a RAM and an A/D converter which are assembled into a one-chip construction.

2. Description of the Prior Art

Generally, in case of a battery charger adapted to charge a battery, especially a battery having a plurality of battery cells connected in series with each other, an output port of a microcomputer may not be directly connected to the gate of a thyristor. When the gate of the thyristor is directly connected to the microcomputer, the output port of the microcomputer cannot bear the battery voltage since the battery voltage is higher than a normal power source voltage for the microcomputer.

For this reason, a conventional battery charger incorporates a first transistor connected to the gate of a thyristor, and a second transistor connected to the base of the first transistor.

Figure 10:
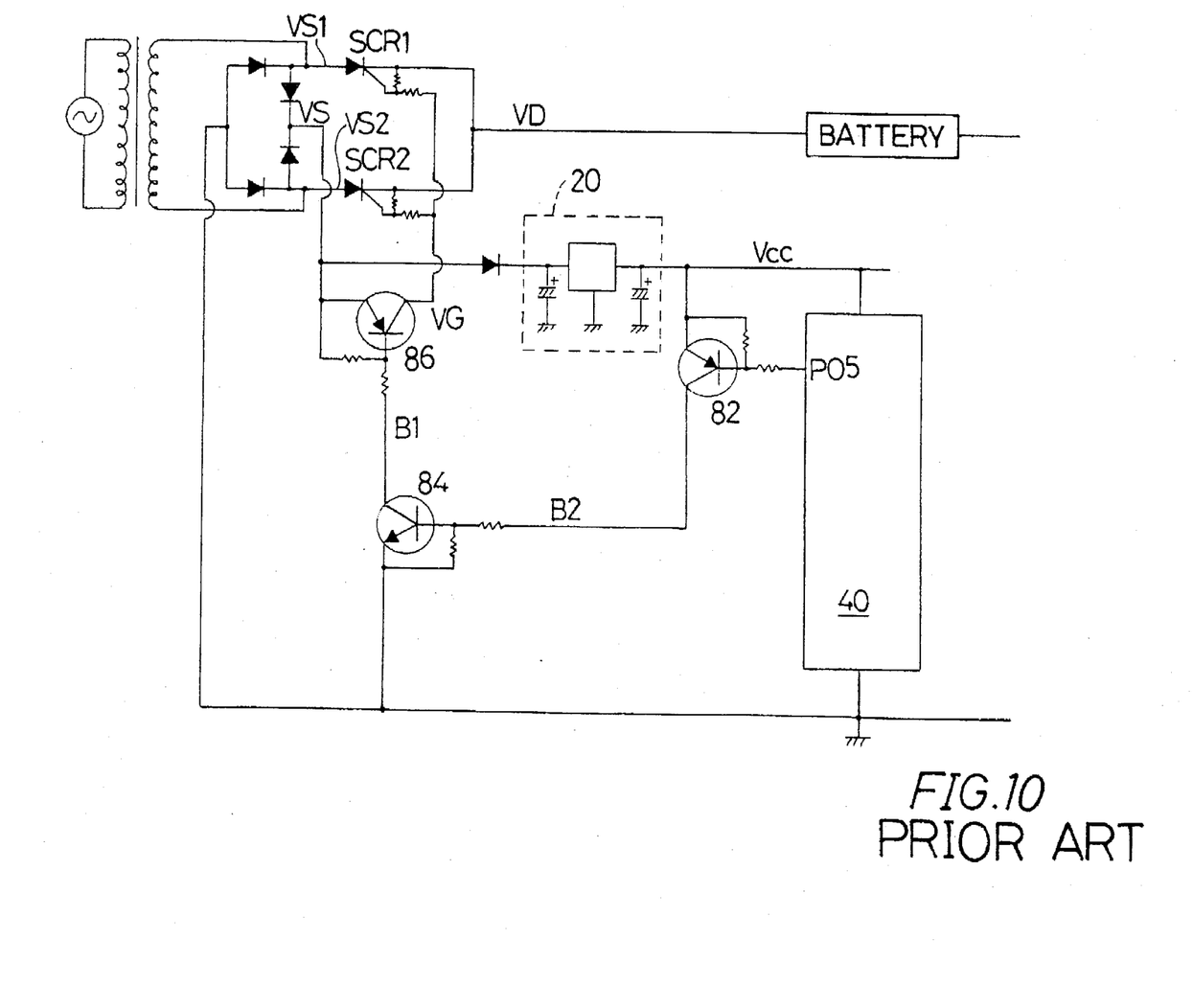
FIG. 10 is a circuit configuration of the conventional battery charger.

A typical circuit configuration of the conventional battery charger is shown in FIG. 10. In this circuit, two thyristors SCR1 and SCR2 for rectification and phase-control purposes have their gates connected to the collector of a first transistor 86. The emitter of the first transistor 86 receives a rectified charging voltage VS. The base of the first transistor 86 is connected to the collector of a second transistor 84. Here, the voltage VS applied to the emitter of the first transistor 86 is still not processed by a constant voltage circuit 20 and does not have a constant value. Therefore, the voltage VS is pulsated with its absolute value maintained equal to those of charging voltages VS1 and VS2 on the sides of anodes of the thyristors SCR1 and SCR2, and the voltage VS has a peak value higher than a battery voltage VD. The base of the second transistor 84 is connected to the collector of a third transistor 82. The emitter of the second transistor 84 is grounded. The emitter of the third transistor 82 receives a voltage Vcc which is a power source voltage for a microcomputer 40 and which has a constant value through the operation of the constant voltage circuit 20. The base of the third transistor 82 is connected to an output port P05 of the microcomputer 40. Here, the battery voltage VD is higher than the power source voltage Vcc for the microcomputer 40. Further, the rectified charging voltage VS is pulsated in response to the frequency of a commercial AC power source and has the peak value higher than the battery voltage VD as described above.

With this circuit, the battery voltage VD is applied to the gates of the thyristors SCR1 and SCR2, and the charging voltage VS is applied to the base of the first transistor 86. Therefore, it is not appropriate to directly connect the base of the first transistor 86 to the output port P05 of the microcomputer 40. To this end, the second transistor 84 is incorporated in this circuit. Since the base of the second transistor 84 does not receive the battery voltage VD or the charging voltage VS, the base of the second transistor 84 may be directly connected to the output port P05. However, before initialization, the output port P05 of the microcomputer 40 normally outputs a HIGH signal. Therefore, if the base of the second transistor 84 is directly connected to the output port P05, the thyristors SCR1 and SCR2 may be fired immediately after the power has been supplied, so that the phase control of the charging current cannot be successfully performed. Thus, the third transistor 82 is incorporated to invert the logic output from HIGH to LOW or vice versa.

Further, in place of a multi-stage transistor system as described above, it is well known to incorporate a circuit having a transformer for increasing the voltage to be applied to the gate of the thyristor. In this case, in response to conversion between HIGH and LOW at the output port P05, the power source voltage Vcc for the microcomputer 40 is switched on and off by means of a transistor having its base connected to the output port P05. The transient phenomenon produced by on-off switching of the power source voltage Vcc is utilized to increase the voltage by the transformer, and the increased voltage is applied to the gate of the thyristor. Thus, this circuit does not require the multi-stage transistor system.

With the system of FIG. 10 or the system incorporating the multi-stage transistor system inevitably causes an increase in the number of necessary transistors, so that the manufacturing costs of the battery charger increase. Further, the battery charger must have a broader space for accommodating the transistors, so that it is difficult to construct the battery charger to have a smaller size even if a smaller battery charger is desired.

In case of the transformer system, because of the provision of the transformer, this system still renders certain problems in the manufacturing costs and the accommodating space of the system. Further, this system may cause the problem of producing electromagnetic noises.

These disadvantages are a first problem to be solved by the present invention.

In the transformer system as described above, the voltage higher than the power source voltage of the microcomputer is obtained by utilizing the transient phenomenon produced when the output port of the microcomputer is switched between HIGH and LOW, and such a higher voltage is applied to the gate of the thyristor. As described in connection with FIG. 10, the battery voltage VD is applied to the thyristor on the side of the cathode, while the rectified charging voltage VS is applied to the thyristor on the side of the anode. Although the peak value of the charging voltage is higher than the battery voltage, the period of "charging voltage<battery voltage" exists since the charging voltage is pulsated at the frequency of the commercial power source.

In case of the transformer system, when a firing signal is outputted from the output port P05 during the period of "charging voltage<battery voltage", or when a firing voltage is applied to the gate of the thyristor during the period of "charging voltage<battery voltage", the thyristor is not fired.

This is a second problem to be solved by the present invention.

The present invention is therefore intended to solve the first problem of the prior art by realizing a new system which can be incorporated in place of the multi-stage transistor system or the transformer system and which does not cause any problem in the manufacturing costs, the accommodating space and the electromagnetic noises.

In another aspect, the present invention is intended to solve the second problem of the prior art so as to prevent the thyristor from mis-firing.

OBJECTS OF THE INVENTION

It is, accordingly, an object of the present invention to provide a battery charger which can be manufactured at lower costs with its function properly maintained.

It is another object of the present invention to provide a battery charger which is small in size.

It is a further object of the present invention to provide a battery charger which is operable to properly fire a thyristor for phase control of a charging current.

SUMMARY OF THE INVENTION

According to the first aspect of the present invention, there is provided a battery charger comprising:

- a microcomputer operable to receive an input value corresponding to a value of a charging current;
- a thyristor having the gate connected to an output port of the microcomputer;
- the microcomputer being operable to adjust the firing angle of the thyristor for controlling the value of the charging current through a phase control of the charging current in response to the input value;
- a capacitor having a first electrode and a second electrode, the first electrode being connected to the gate of the thyristor; and
- a transistor having the collector connected to the second electrode, the base connected to the output port of the microcomputer, and the emitter connected to a power source voltage for the microcomputer.

With this construction, since the capacitor is interposed between the gate of the thyristor and the output port of the microcomputer, the battery voltage applied to the gate of the thyristor or the charging voltage may not be directly applied to the output port of the microcomputer. The thyristor is fired when the gate of the thyristor receives a voltage higher than the battery voltage by a transient phenomenon which is produced spontaneously upon switching of the transistor. Thus, the present invention may provide a practical thyristor firing circuit comprising mainly of one transistor and one capacitor. Therefore, the battery charger can be manufactured at lower costs and can be small in size.

According to the second aspect of the present invention, there is provided a battery charger having the same construction as the first aspect but the microcomputer is programmed to repeatedly output the firing signal to the output port after the firing signal is outputted to the output port at the first time.

Otherwise, the microcomputer is programmed to repeatedly output the firing signal after the firing signal is outputted to the output port for the first time, on the condition that the phase of the firing signal outputted for the first time is smaller than a predetermined phase.

Practically, a battery charger according to the second aspect includes:

- a microcomputer operable to receive an input value corresponding to a value of a charging current;
- a thyristor having the gate connected to an output port of the microcomputer;
- the microcomputer being operable to adjust the firing angle of the thyristor for controlling the value of the charging current through a phase control of the charging current in response to the input value;
- a transistor having the base connected to the output port of the microcomputer and operable to switch on and off a power source voltage for the microcomputer in response to conversion between HIGH and LOW at the output port;
- a voltage increasing circuit operable to produce an increased voltage higher than the power source voltage of the microcomputer through a transient phenomenon produced when said transistor is switched between on and off;
- a circuit for applying the increased voltage to the gate of the thyristor;
- the microcomputer being programmed to repeatedly output a firing signal after the firing signal is outputted to said output port at the first time, on the condition that the phase of the firing signal outputted at the first time is smaller than a predetermined phase.

With this construction, due to the program of the microcomputer to repeatedly output the firing signal after outputting the first firing signal for the purpose of phase control, the thyristor is fired by any one of the firing signals outputted after outputting the first firing signal even if the relationship "charging voltage<battery voltage" exists when the first firing signal is outputted. Since the charging voltage is pulsated, the relationship "charging voltage>battery voltage" exists when outputting any one of the firing signals after the first firing signal. Here, the firing operation of the thyristor during "charging voltage<battery voltage" is naturally meaningless, and therefore, this system does not produce any problems.

On the other hand, if the repeated output of the firing signal is performed without any limitation, this may badly influence the phase control to be performed when the pulse of the charging voltage is transferred to the next cycle. To this end, the repeated output of the firing signal is performed only when the phase of the first firing signal is smaller than the predetermined phase, so that the bad influence at the next cycle can be prevented.

This system of the second aspect may be advantageously incorporated into the system of the first aspect of the present invention as well as the prior art transformer system. Thus, the system of the second aspect can be generally adapted to every system in which a voltage higher than a power source voltage of a microcomputer is obtained by utilizing the transient phenomenon produced when an output port of the microcomputer is switched between HIGH and LOW, and in which such a higher voltage is applied to the gate of a thyristor. Consequently, the problem of mis-firing can be solved by the improved programming of the microcomputer, so that the battery charger can be reliably operated.

The invention will become more apparent from the appended claims and the description as it proceeds connection with the drawings.

DETAILED DESCRIPTION OF THE PREFERRED EMBODIMENT

An embodiment of the present invention will now be explained with reference to the accompanying drawings.

Figure 1:
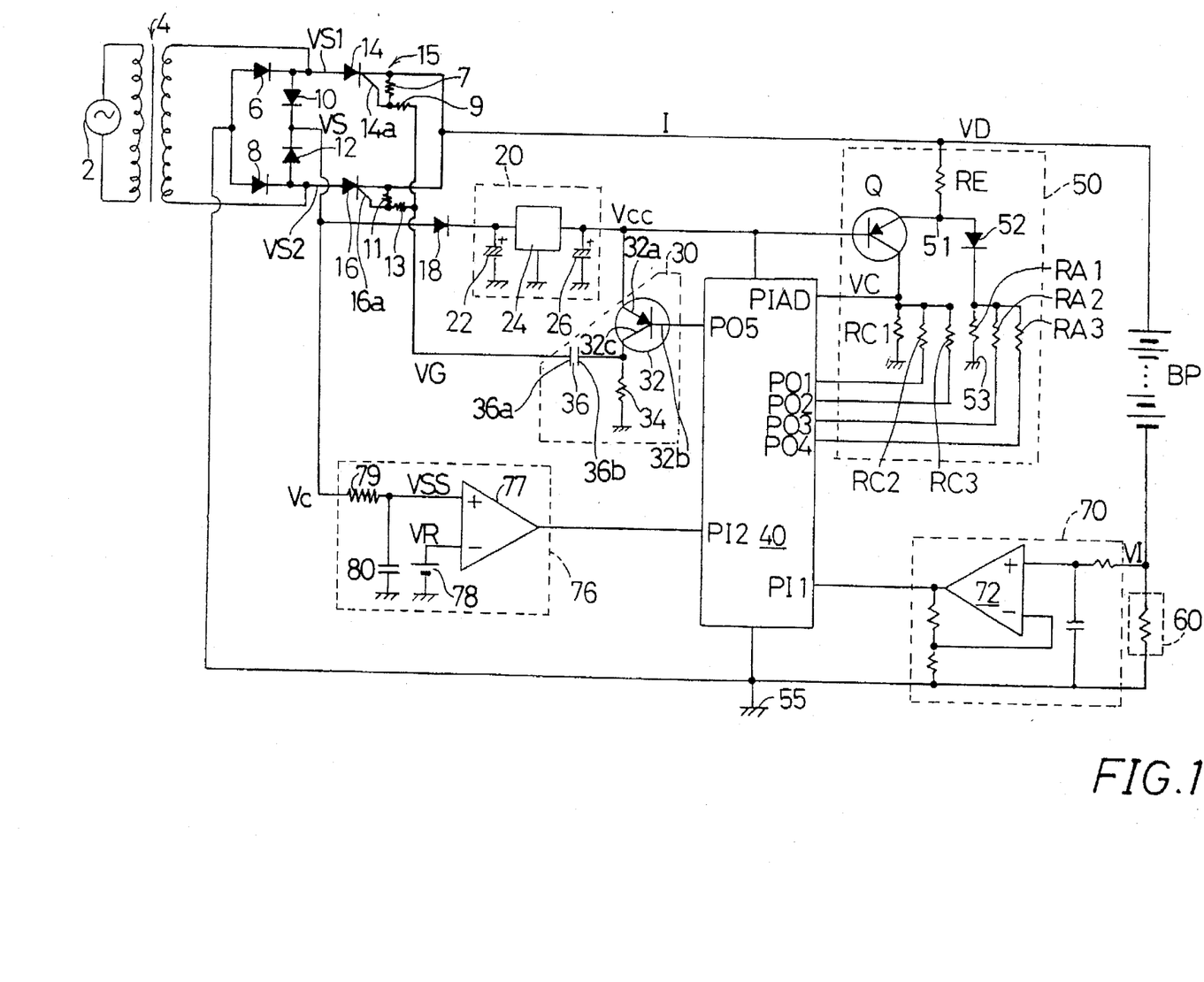
FIG. 1 is a circuit configuration of a battery charger according to an embodiment of the present invention.

Referring to FIG. 1, there is shown a battery charger which is operable to charge three kinds of batteries having different rating voltages. Power supplied from a commercial AC power source 2 is reduced by a transformer 4 and is rectified by a bridge circuit 15 including diodes 6 and 8 and thyristors 14 and 16. Thus, a charging current I is rectified by the bridge 15 and is adjusted in firing angle at the thyristors 14 and 16. The charging current I is then supplied to a battery BP so as to charge the same. The amplitude of the charging current I is detected by a shunt resistor 60. The charging current I is converted into a voltage V1 and is amplified by a voltage amplifying circuit 70 which mainly comprises an operational amplifier 72. The value of the charging current I is then supplied to a one-chip microcomputer 40. Here, the firing angles at the thyristors 14 and 16 are controlled by the microcomputer 40 in response to the value of the charging current I, so that the charging current I is maintained at a constant value.

Diodes 10 and 12 cooperate with the diodes 6 and 8 to form a bridge for taking out voltage for the control purpose. The voltage rectified by the bridge comprising the diodes 6, 8, 10 and 12 is converted into a constant voltage Vcc by a constant voltage circuit 20 including capacitors 22 and 26 and a voltage regulator 24. The constant voltage Vcc is used as a power-source voltage for a transistor 32, a transistor Q, the microcomputer 40 and the operational amplifier 72. The transistors 32 and Q will be explained later.

The microcomputer 40 has a CPU, a ROM, a RAM, input ports PIAD, PI1 and PI2, output ports P01 to P05 and an A/D converter which are assembled into one-chip construction. The input port PIAD receives the voltage VC which corresponds to a battery voltage VD of the battery BP. The input port PI1 receives the value of the charging current I which has been converted into the voltage value as described above. A zero-voltage timing detecting circuit 76 outputs a timing signal which is switched from HIGH to LOW voltage when the voltage rectified by the bridge of the diodes 6, 8, 10 and 12 has become substantially zero. The timing signal is then inputted to the input port PI2. The zero-voltage timing detecting circuit 76 mainly comprises a comparator 77. The comparator 77 has two input terminals, one of which receives a voltage VSS resulting from smoothing of the voltage VS (rectified by the diodes 6, 8, 10 and 12) by a resistor 79 and a capacitor 80. The other of the input terminals of the comparator 77 receives a constant reference voltage VR having a value of nearly zero. The comparator 77 outputs a HIGH signal when VSS>VR, and a LOW signal when VSS<VR.

The output port P05 of the microcomputer 40 is connected to a firing signal generating circuit 30 which mainly comprises a PNP transistor 32. More specifically, the output port P05 is connected to the base 32b of the PNP transistor 32, the emitter 32a of the transistor 32 receives the supply of the power source voltage Vcc for the microcomputer 40, and the collector 32c of the transistor 32 is connected to gates 14a and 16a of the thyristors 14 and 16 through a capacitor 36. The output port P05 normally outputs a HIGH signal and is switched to output a LOW signal for a short time when the thyristors 14 and 16 are to be fired. Here, the gate 14a of the thyristor 14 is connected to an electrode 36a on one side of the capacitor 36 via a resistor 9, while the gate 16a of the thyristor 16 is also connected to the electrode 36a of the capacitor 36 via a resistor 13. The cathode of the thyristor 14 is connected to the gate 14a via a resistor 7, and the cathode of the thyristor 16 is connected to the gate 16a via a resistor 11. Here, one of the resistors 7 and 11 as well as one of the resistors 9 and 13 may be connected in common to the thyristors 14 and 16. Another electrode 36b of the capacitor 36 is connected to the collector 32c of the transistor 32 and is then connected to the ground via a resistor 34.

The microcomputer 40 stores a program to adjust the charging current I and repeatedly performs the following steps according to the stored program:

(1) Receiving the value of the charging current I from the input port PI1.

(2) Detecting the zero-timing from the input of the input port PI2.

(3) Extending the period between the inputted zero-timing and the timing for outputting the LOW signal from the output port P05 when the inputted charging signal I is equal to or greater than a predetermined value, and shortening this period when the charging current I is lower than the predetermined value.

In this embodiment, the firing signal of the thyristors 14 and 16 results from conversion of the output signal of the output port P05 from HIGH to LOW, and based on a timing of such conversion, the firing angle of the thyristors 14 and 16 is adjusted for the phase control of the charging current I. As will be explained later, the operation for conversion of the output signal of the output port P05 from HIGH to LOW is repeatedly performed after the firing signal is produced in the above step (3). Thus, the firing signal is repeatedly outputted after the first firing signal is outputted in step (3).

Figure 2A:
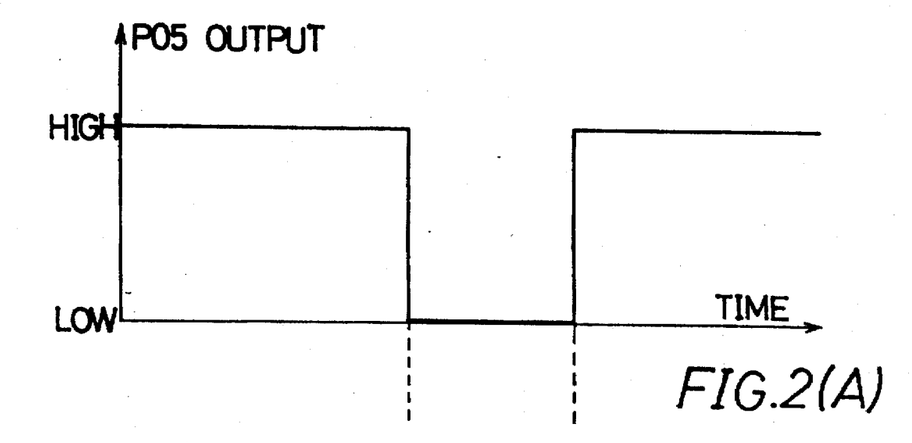
FIGS. 2(A) and 2(B) are explanatory graphs showing variations in a firing signal and a gate voltage of a thyristor, respectively.
Figure 2B:
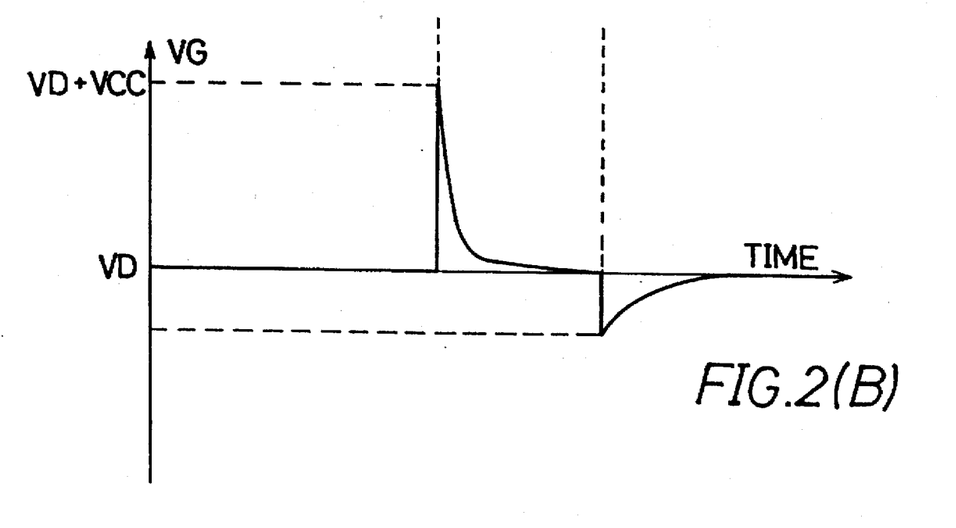

When the output port P05 outputs the HIGH signal, the PNP transistor 32 is switched off, so that a voltage VG at the gate 14a of the thyristor 14 or at the gate 16b of the thyristor 16 is equal to the battery voltage VD (see FIGS. 2(A) and 2(B)). When the output port P05 is converted to output the LOW signal, the transistor 32 is switched on, so that the charging current is supplied to the capacitor 36. As the result of this operation, the potential at the electrode 36a on one side of the capacitor 36 becomes greater than the previously applied voltage or the battery voltage VD by a value substantially corresponding to the power source voltage Vcc, so that the gates 14a and 16a of the thyristors 14 and 16 receive a voltage sufficient to fire.

Here, the gate voltage VG at the thyristors 14 or 16 soon recovers to a value equal to the battery voltage VD through discharge via the resistors 7 and 11. The transistor 32 is switched off when the output of the output port P05 is converted from LOW to HIGH, so that the charge at the other electrode 36b is discharged, resulting in a spontaneous drop of the gate voltage VG. Since such discharge from the other electrode 36b is slowly performed via the resistor 34, the drop at a peak of the gate voltage VG on the negative side is relatively small.

When the detected charging current I is very small, the microcomputer rapidly advances the firing angle for the thyristors 14 and 16. In this case, a problem may be caused in that the thyristors 14 and 16 may not be fired because of "charging voltage<battery voltage" even if the firing signal has been supplied to the thyristors 14 and 16.

Figure 3:
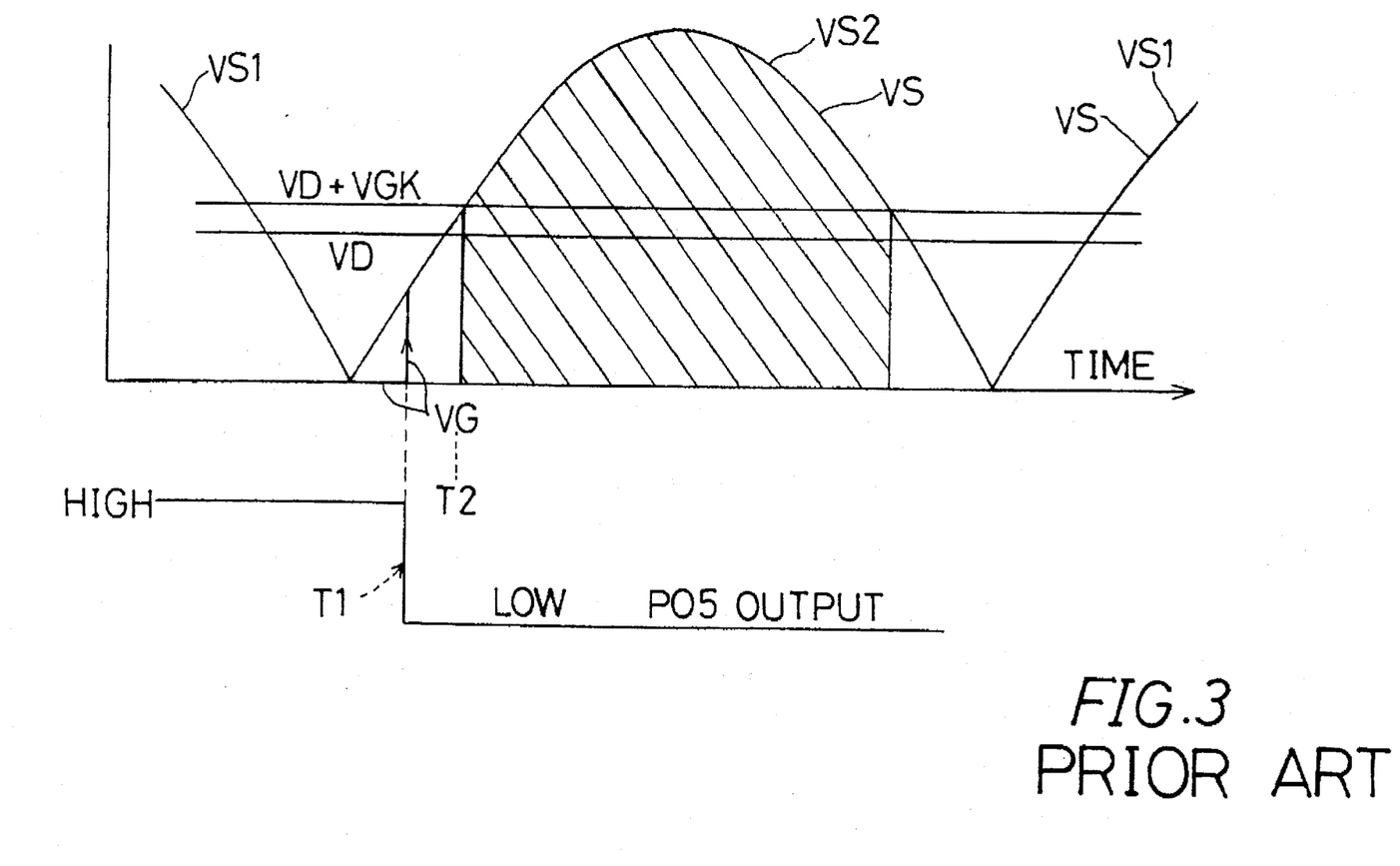
FIG. 3 is an explanatory graph showing the relationship between a charging voltage VS (VS1, VS2) and a battery voltage VD, with the firing timing and the variation in the gate voltage in case of a conventional battery charger.

Such a problem may also result in the conventional battery charger shown in FIG. 10. With the conventional battery charger, the charging voltage may have a value lower than the battery voltage VD as shown in FIG. 3 when the firing signal is transmitted to the thyristors SCR1 and SCR2 or when the output of the output port P05 is converted from HIGH to LOW. In FIG. 3, VS1 represents a voltage or a potential on the side of the anode of the thyristor SCR1 when the potential is positive (The negative potential need not be considered since the thyristor SCR1 does not operate when the potential is negative). VS2 represents a voltage or a potential on the side of the anode of the thyristor SCR2 when the potential is positive. Since the voltage VS is a full-wave rectified voltage, it always has a positive potential.

In case of the conventional battery charger, the thyristors SCR1 and SCR2 may not be fired when the output of the output port P05 is converted from HIGH to LOW at a timing T1 in FIG. 3. At the timing T1, the voltage VS1 as well as the voltage VS2 is lower than the battery voltage VD. However, if the output from the output port P05 is held low, any of the thyristors SCR1 and SCR2 may be fired when VS>VD, more specifically when VS>VD+VGK (VGK: voltage drop between the gate and the cathode of the thyristor SCR1 or SCR2) since the full-wave rectified voltage VS is continuously applied to the gates of the thyristors SCR1 and SCR2. Thus, the charging current I begins to flow at a timing T2 in FIG. 3. Here, although no firing is performed prior to the timing T2, this may not cause any problem since the firing prior to the timing T2 is meaningless.

Figure 4:
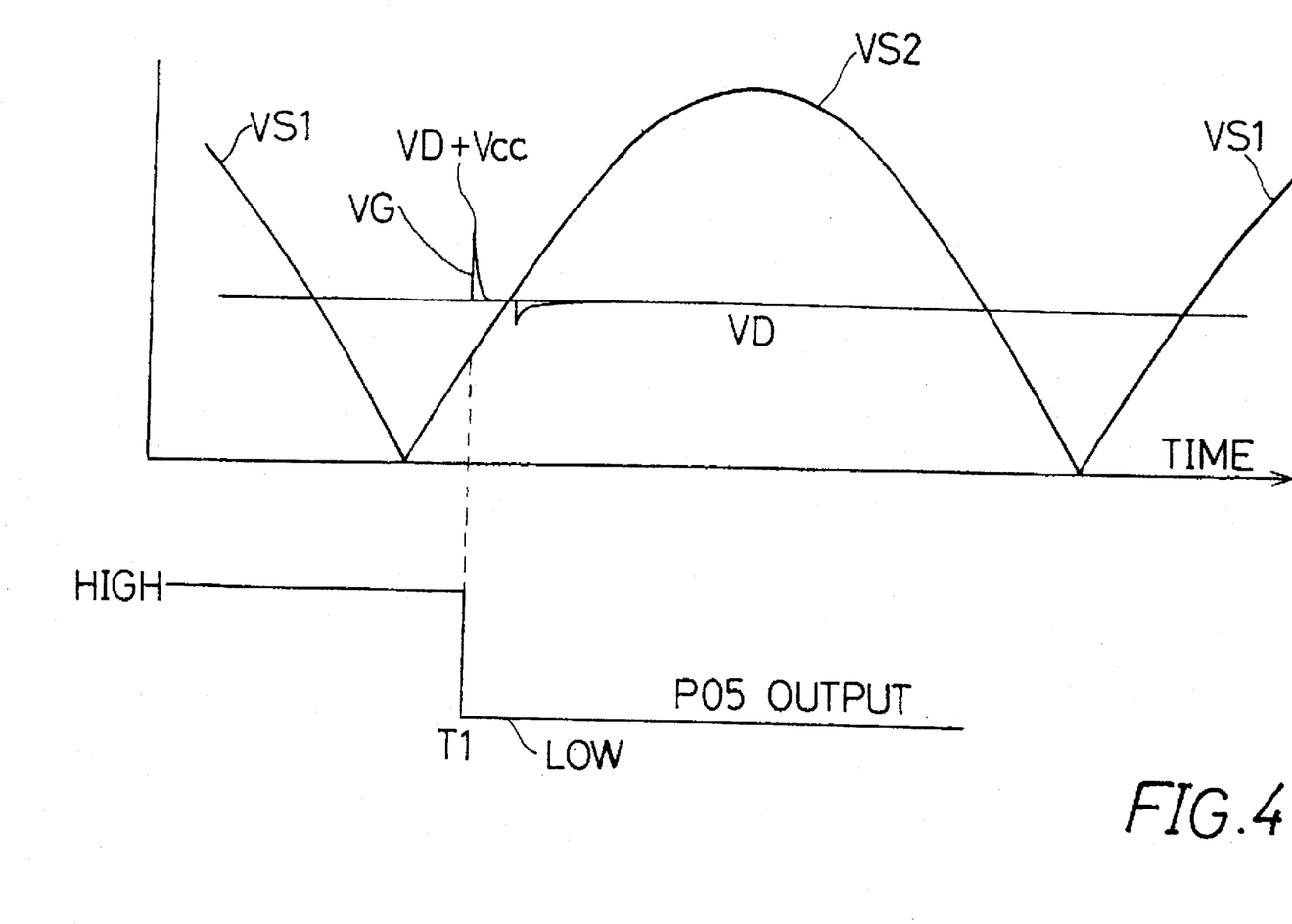
FIG. 4 is an explanatory graph similar to FIG. 3 but illustrating the operation of the embodiment of the present invention.

On the other hand, in case of the battery charger of the embodiment shown in FIG. 1 or the conventional transformer system, the thyristor(s) is fired based on the transient phenomenon as shown in FIG. 2. Therefore, the thyristor(s) is not fired if the charging voltage VS1 or VS2 is lower than the battery voltage VD at the timing T1 of outputting the firing signal as shown in FIG. 4. Although the voltage VS1 or VS2 increases to have a greater value than the battery voltage VD after the timing T1, the thyristor(s) is not fired at the timing T2 since the gate voltage of the thyristor(s) has already been lowered from the firing level at the timing T2. Thus, no charging current I flows in this case.

This problem can be solved by repeatedly transmitting the firing signal after the firing signal is outputted at the first time at a timing in response to the value of the charging current I. Thus, with the repeated transmission of the firing signal after the first firing signal, the thyristor(s) may reliably be fired when the charging voltage exceeds the battery voltage.

Figure 5:
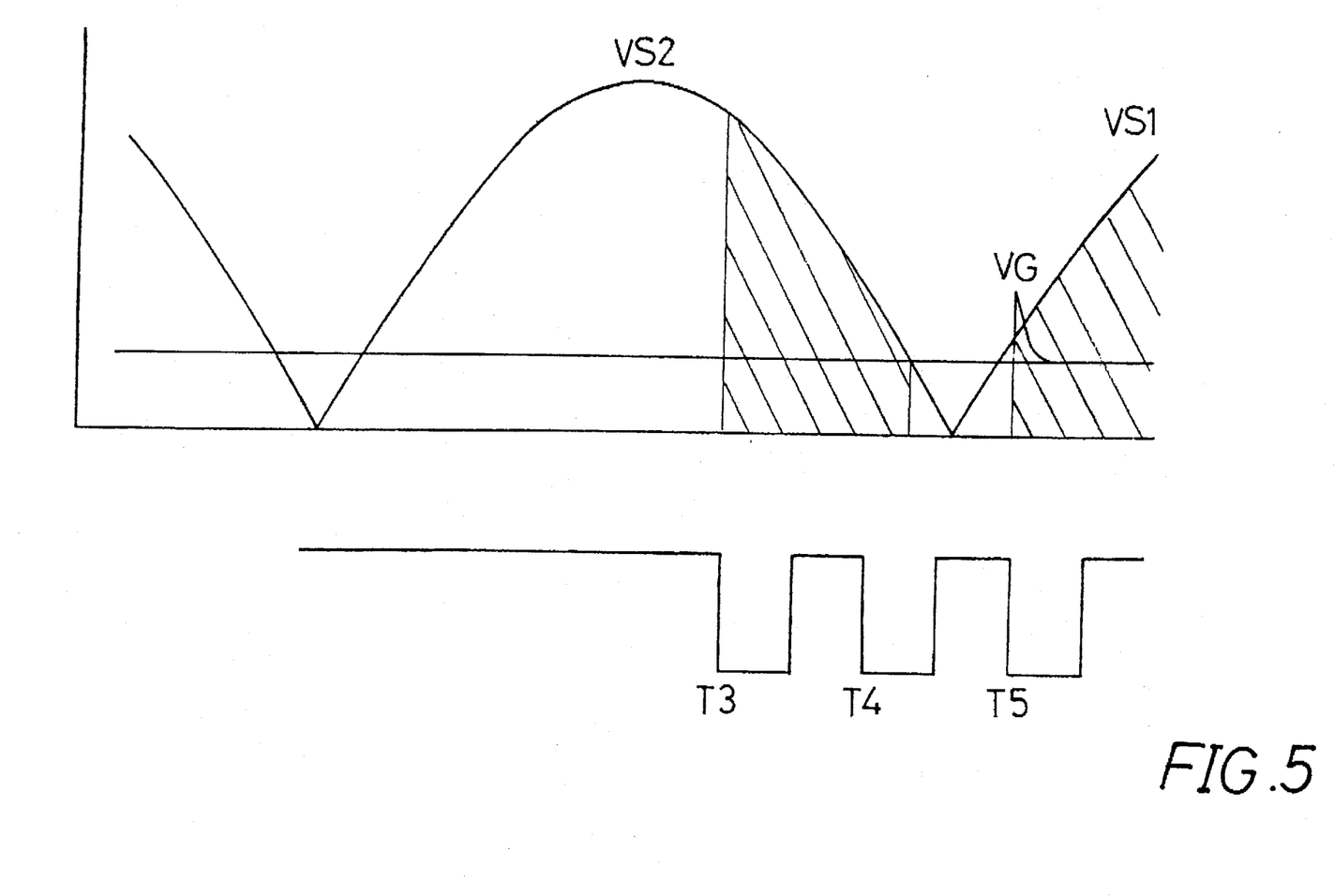
FIG. 5 is an explanatory graph illustrating a problem which may be caused in repeated output of a firing signal.

However, this system for solution of the above problem may cause another problem although the firing of the thyristor(s) is reliably performed. That problem will be explained with reference to FIG. 5 which shows the operation where the firing signal is transmitted at a timing T3 at the first time, and the firing signal is thereafter transmitted at two timings or timings T4 and T5. With this operation, the last timing T5 is within the next cycle of the charging voltage (VS1 or VS2), and therefore, the thyristor(s) is fired at undesirable timing (timing T5 in this case).

As a countermeasure for solving this problem, the repeated outputting of the firing signal may be interrupted when the zero-timing has been detected by the zero-timing detection circuit 76. This countermeasure however does not successfully operate as will be seen from FIG. 6. As described previously, the zero-timing detection circuit 76 includes the resistor 79 and the capacitor 80 for the purpose of smoothing, and therefore, the voltage VSS inputted to the comparator 77 is different in phase from the voltages VS, VS1 and VS2. This may result in that a zero timing T11 detected by the zero-timing detection circuit 76 is delayed from an actual zero-timing T13.

Figure 6:
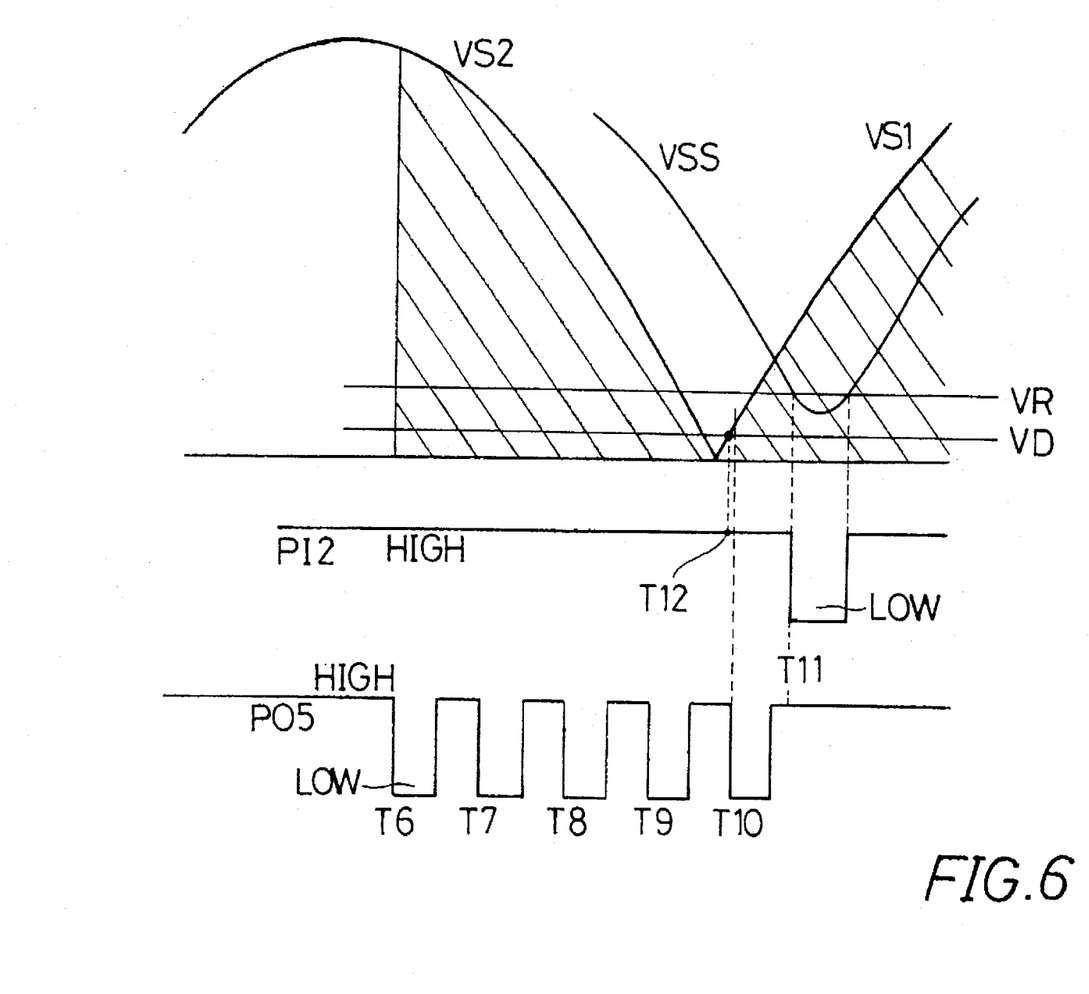
FIG. 6 is an explanatory graph illustrating another problem which may be caused in the repeated output of the firing signal.

For this reason, even if the repeated output of the firing signal is stopped after the zero-timing T11 has been detected, any of the firing signals outputted prior to stopping may be within the next cycle of the voltages VS1 or VS2 as indicated by a timing T10 in FIG. 6. If the voltage VS1 or VS2 is greater than the battery voltage VD at such timing, the thyristor(s) may be conducting substantially throughout the next cycle.

This may cause a significant problem if the microcomputer 40 is an inexpensive one such as a four-bit microcomputer since such a microcomputer has a lower processing speed. Further, when an interrupt operation such as an operation for processing the input of the battery voltage VD is performed by the microcomputer 40, the second output timing T4 and the third output timing T5 in FIG. 5 of the firing signal will be considerably delayed to cause a more significant problem.

Figure 7:
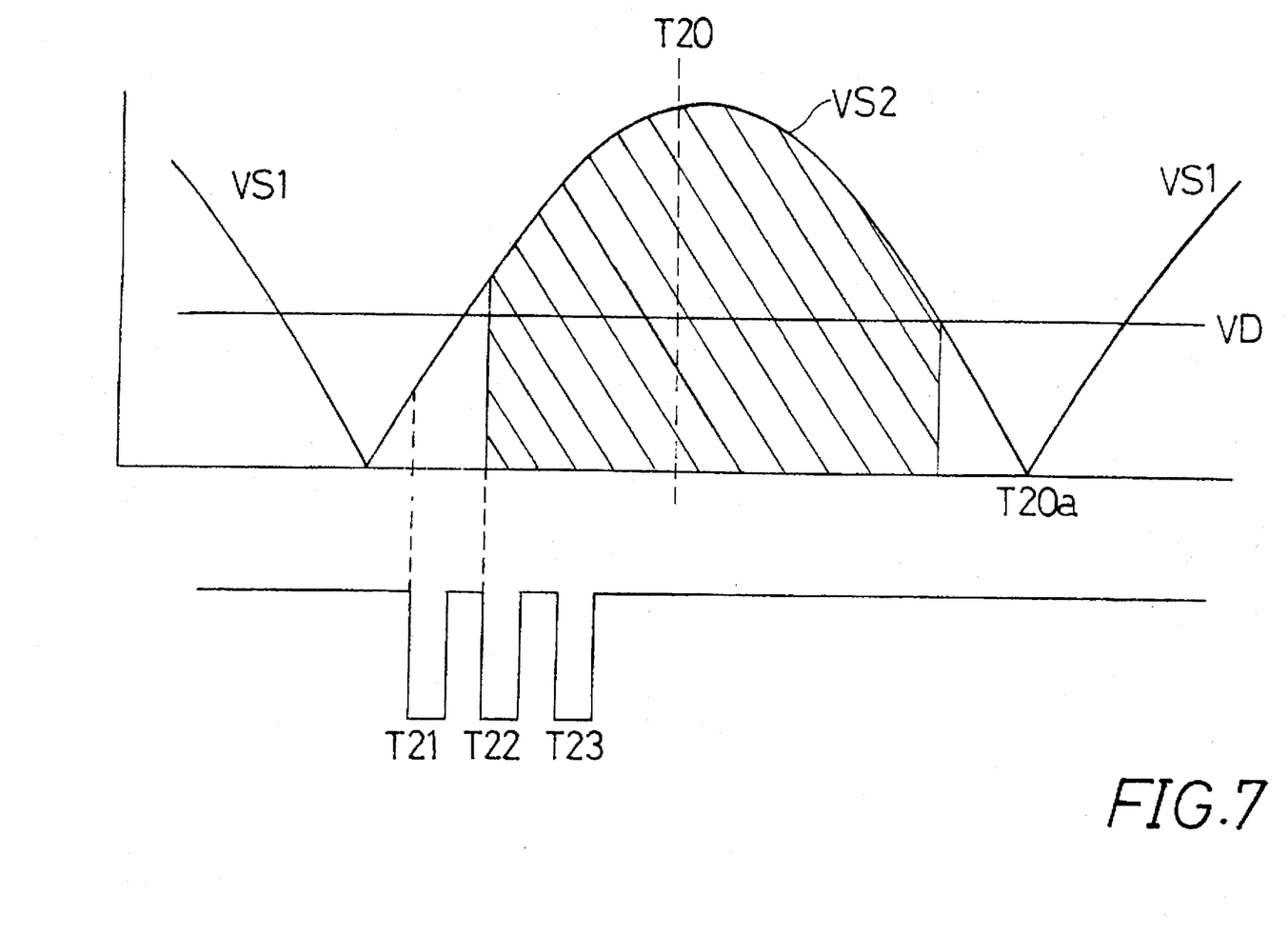
FIGS. 7 and 8 are explanatory graphs illustrating the timings of the firing signals in the embodiment.
Figure 8:
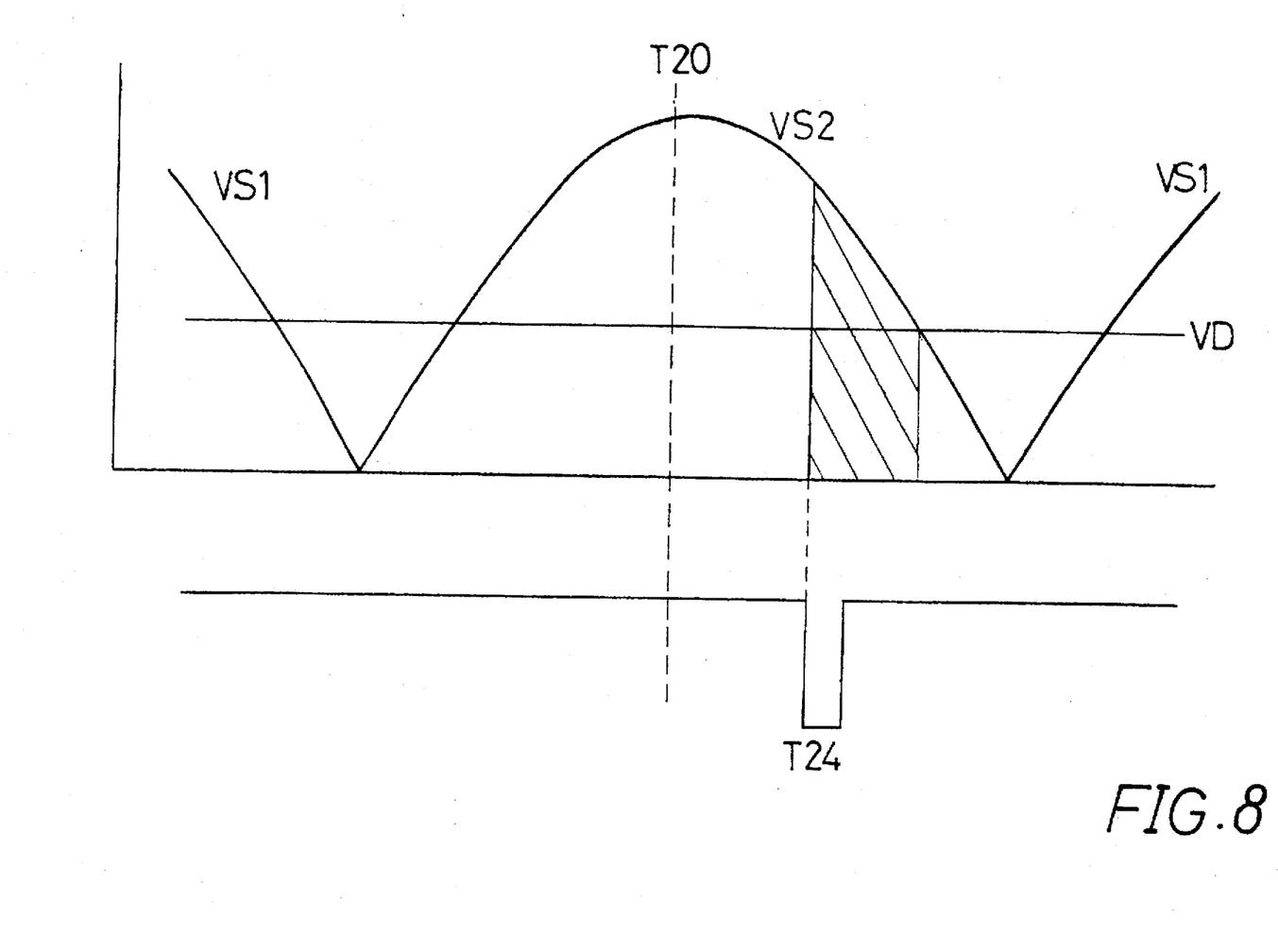

FIGS. 7 and 8 show a countermeasure for solving this problem. As shown in FIG. 7, the firing signal is repeatedly outputted as long as the phase of a firing timing T21 for phase control of the charging current I is smaller than a predetermined phase T20 counted from the detected zero-timing. Although there will be some possibility that the charging voltage becomes lower than the battery voltage immediately after the zero-timing, the thyristor(s) may be fired without fail due to the repeated output of the firing signal. Here, the number of repeatings of output of the firing signal is determined such that the repeated firing is finished during the period between the predetermined phase T20 and an actual zero-timing T20a. The time required to perform the interrupt operation is to be taken into account in determination of the repeating number. With this determination, the repeated firing signal is reliably prevented from being outputted during the next cycle.

When the phase of the firing signal outputted for the first time is greater than the predetermined phase T20, no further firing signal is outputted as shown in FIG. 8. In this case, the firing signal does not need to be repeatedly outputted since the first firing signal is outputted when "charging voltage>battery voltage". Preferably, the predetermined phase T20 is about 90°. The above process described in connection with FIGS. 7 and 8 is performed according to a program previously stored in the ROM of the microcomputer 40.

As shown in FIG. 1, the battery charger of this embodiment includes a battery voltage detecting circuit 50. The battery voltage detecting circuit 50 is operable to produce a divided voltage VC from the battery voltage VD and includes one voltage-dividing resistor RE on one side and a group of three different kinds of voltage-dividing resistors RC1, RC2 and RC3 on the other side. The transistor Q is interposed between the voltage-dividing resistor RE and the group of the voltage-dividing resistors RC1, RC2 and RC3. The constant voltage Vcc is applied to the base of the transistor Q. Three different kinds of bypass resistors RA1, RA2 and RA3 are connected in parallel between earthing lines 53 and 55 and a connecting point 51 which connects the transistor Q to the voltage-dividing resistor RE. The voltage-dividing resistor RC2 is connected to the output port P01, and the voltage-dividing resistor RC3 is connected to the output port P02. On the other hand, the bypass resistor RA2 is connected to the output port P03, and the bypass resistor RA3 is connected to the output port P04. Here, the output ports P01 to P04 are normally maintained not to be electrically connected to the earthing line 55 but are connected thereto through operation of the microcomputer 40. Thus, the output ports P01 to P04 function as switches between these ports and the earthing line 55. More specifically, the output ports P03 and P04 serve as first switches for inhibiting and effectuating the bypassing operation of the bypass resistors RA2 and RA3 when they are turned on and off. The output ports P01 and P02 serve as second switches for inhibiting and effecting the dividing operation of the voltage-dividing resistors RC2 and RC3 when they are turned on and off.

By virtue of the provision of three kinds of voltage-dividing resistors RC1 to RC3 as well as three kinds of bypass resistors RA1 to RA3, the battery charger of this embodiment can be adapted to charge the batteries BP having three different rating voltages.

Figure 9:
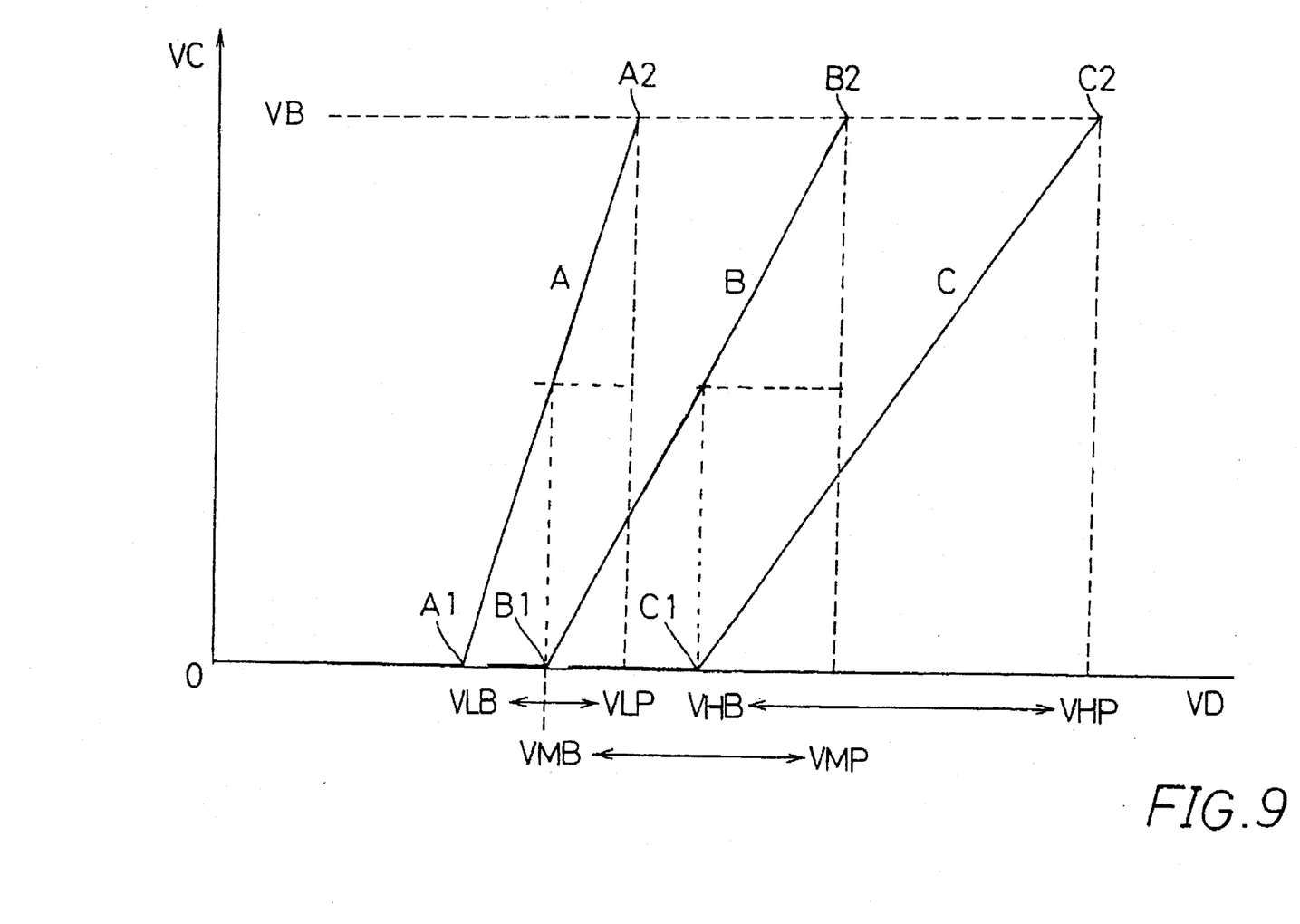
FIG. 9 is a graph showing various characteristic lines of divided voltage with respect to the battery voltage.

FIG. 9 shows three characteristic lines A, B and C of the divided voltage VC which can be obtained in this embodiment.

The characteristic line A is obtained when all of the output ports P01 to P04 are turned off. In this case, the battery voltage at which the divided voltage VC is varied from zero (the battery voltage at a point A1) is (1+RE/RA1) times as the base voltage VB of the transistor Q in addition to the voltage drop VBE between the base and the emitter of the transistor Q. Further, the inclination of the line A is RC1/RE.

The characteristic line B represents the characteristic obtained when the output ports P01 and P03 are turned on while the output ports P02 and P04 are turned off. In this case, a dividing resistance on the other side of the voltage-dividing resistor RE is provided as a combined resistance of the voltage-dividing resistors RC1 and RC2 connected parallel to each other. The combined divisional resistance is lower than the value of the voltage-dividing resistor RC1, so that the line B has a relatively gentle inclination. On the other hand, a bypass resistance is provided as a combined resistance of the bypass resistors RA1 and RA2 connected parallel to each other. The combined bypass resistance is lower than the value of the bypass resistor RA1. Accordingly, in this case, the battery voltage at which the divided voltage VC is varied from zero (the battery voltage at a point B1) is greater than the value which results from the case of the line A.

The characteristic line C represents the characteristic obtained when the output ports P01 and P03 are turned off while the output ports P02 and P04 are turned on. In this case, the dividing resistance is provided as a combined resistance of the voltage-dividing resistors RC1 and RC3 connected parallel to each other. On the other hand, the bypass resistance is provided as a combined resistance of the bypass resistors RA1 and RA3 connected parallel to each other. The divided voltage VC is varied from zero at a point C1.

In FIG. 9, points A2, B2 and C2 represent timings when the batteries having three different rating voltages are fully charged, respectively.

With this embodiment, a fourth characteristic line may be obtained when all of the output ports P01 to P04 are turned on.

As for the line A, the point A1 is adjusted to correspond to lowermost voltage VLB of a battery having a lower rating voltage, and the point A2 to highest voltage VLP of the same battery. As for the line B, the point B1 is adjusted to correspond to lowermost voltage VMB of a battery having a middle rating voltage, and the point B2 to highest voltage VMP of the same battery. As for the line C, the point C1 is adjusted to correspond to lowest voltage MHB of a battery having a higher rating voltage, and the point C2 to highest voltage MHP of the same. Thus, the lines A, B and C are determined to be suitable for the batteries having the lower rating voltage, the middle rating voltage and the higher rating voltage, respectively. Further, the battery voltage at the point B1 is determined to have an average value of the voltages at the points A1 and A2, while the battery voltage at the point C1 is determined to have an average value of the voltages at the points B1 and B2.

The one-chip microcomputer 40 stores a further program for performing the following steps:

(1) Turning off all the output ports P01 to P04 when the charging operation is to be started.

(2) Performing the previously described steps to control the charging current during the charging operation so as to maintain the charging current I at a constant value.

(3) Receiving a signal concerning the battery voltage VD from the input port PIAD when a predetermined time has elapsed after starting the charging operation.

(4) Detecting the divided voltage VC (the divided voltage VC detected in this stage varies according to the characteristic line A in FIG. 9 since the output ports P01 to P04 are turned off in the step (1)).

(5) Continuing the charging operation with the output ports P01 to P04 held off if the detected divided voltage VC is less than ½ times as VB, and monitoring the battery voltage based on the characteristic line A in FIG. 9. (This case applies to the charging operation of the battery having the lower rating voltage.)

(6) Turning on the output ports P01 and P03 with the output ports P02 and P04 held off so as to provide the characteristic line B when the detected divided voltage VC in the step (4) is equal to or more than ½ times as VB.

(7) Continuing the charging operation based on the characteristic line B, and monitoring the battery voltage when the divided voltage VC detected after changing of the characteristic line from A to B is less than ½ times as VB. (This case is applied to the charging operation of the battery having the middle rating voltage.)

(8) Turning off the output ports P01 and P03 and turning on the output ports P02 and P04 so as to provide the characteristic line C when the detected divided voltage VC in step (7) is equal to or more than ½ times as VB. (This case applies to the charging operation of the battery having the higher rating voltage.)

(9) Monitoring the battery voltage based on the characteristic line C during the charging operation in case of step (8).

(10) Detecting the timing of change by a value of −dV from a peak voltage monitored at each of the steps (5), (7) and (9), and stopping a further firing operations of the thyristors 14 and 16 so as to stop charging of the battery.

During the steps of (5), (7) and (9), the batteries having the lower rating voltage, the middle rating voltage and the higher rating voltage are monitored by the characteristic lines A, B and C, respectively, so that the divided voltage VC has substantially the same value irrespective of change of the rating voltage. Therefore, −dV may have a uniform value, and the timing of full charging of the battery can be reliably detected irrespective of changing of the rating voltage.

Additionally, the microcomputer 40 is programmed to determine whether the divided voltage VC is zero when the battery BP is set to the battery charger. When the battery BP is shorted, the divided voltage VC may have a value of zero irrespective of the type of the characteristic line, so that the operation of charging the shorted battery can be reliably inhibited.

While the invention has been described with reference to a preferred embodiment, it is to be understood that modifications or variations may be easily made without departing from the spirit of this invention which is defined by the appended claims.

What is claimed is:

1. A battery charger comprising:

a microcomputer operable to receive an input value corresponding to a value of a charging current;

a thyristor having the gate connected to an output port of said microcomputer;

said microcomputer being operable to adjust the firing angle of said thyristor for controlling the value of the charging current through a phase control of the charging current in response to the input value;

a capacitor having a first electrode and a second electrode, said first electrode being connected to the gate of the thyristor; and a transistor having the collector connected to said second electrode, the base connected to the output port of the microcomputer, and the emitter connected to a power source voltage for the microcomputer.

2. The battery charger as defined in claim 1 wherein said microcomputer is programmed to repeatedly output a firing signal to said output port after said firing signal is outputted to said output port at the first time.

3. The battery charger as defined in claim 1 wherein said microcomputer is programmed to repeatedly output a firing signal after said firing signal is outputted to said output port at the first time, on the condition that the phase of said firing signal outputted at the first time is smaller than a predetermined phase.

4. A battery charger comprising:

a microcomputer operable to receive an input value corresponding to a value of a charging current;

a thyristor having the gate connected to an output port of said microcomputer;

said microcomputer being operable to adjust the firing angle of said thyristor for controlling the value of the charging current through a phase control of the charging current in response to the input value;

a transistor having a base connected to said output port of said microcomputer and operable to switch on and off a power source voltage for said microcomputer in response to conversion between HIGH and LOW in output at said output port; and a voltage increasing circuit operable to produce an increased voltage higher than said power source voltage of said microcomputer through a transient phenomenon produced when said transistor is switched between on and off;

means for applying said increased voltage to the gate of said thyristor;

said microcomputer being programmed to repeatedly output a firing signal after said firing signal is outputted to said output port at the first time, on the condition that the phase of said firing signal outputted at the first time is smaller than a predetermined phase.

* * * * *